(No Model.)
J. A. FERGUSON.
BELT.
No. 499,978. Patented June 20, 1893.
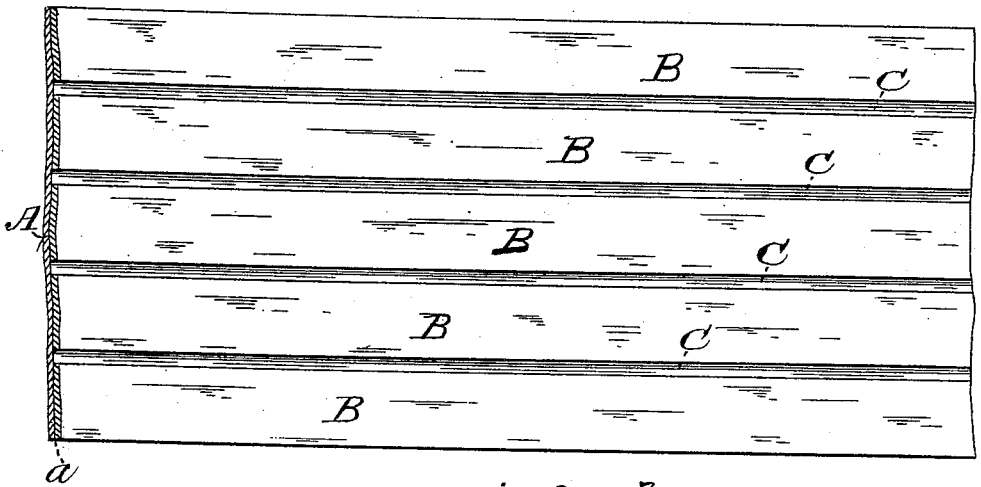
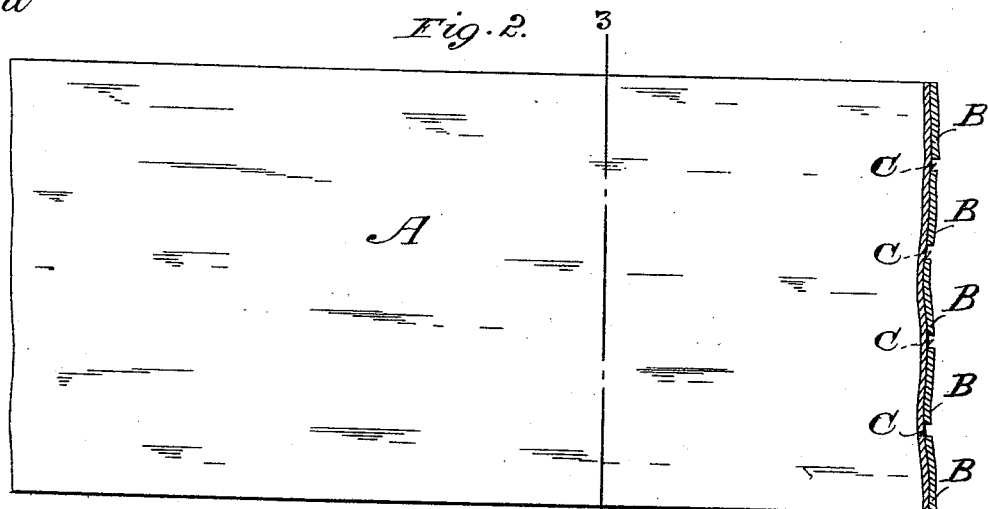
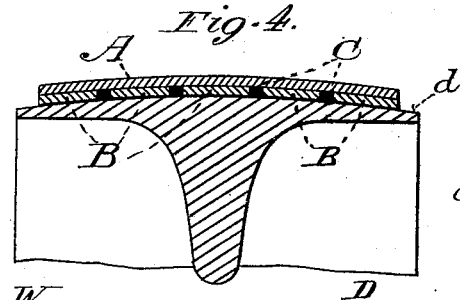
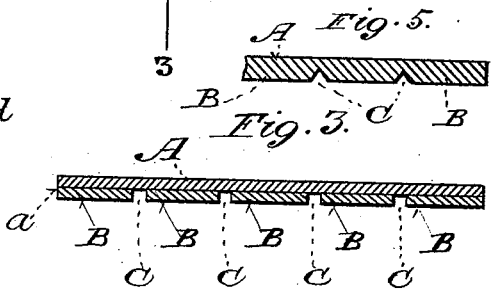
Witnesses
Edward W. Farrell
A. Bonville
Inventor
John A. Ferguson
by C. D. Moody his atty

UNITED STATES PATENT OFFICE.

JOHN A. FERGUSON, OF FERGUSON, MISSOURI.

BELT.

SPECIFICATION forming part of Letters Patent No. 499,978, dated June 20, 1893.

Application filed May 31, 1892. Serial No. 435,064. (No model.)

*To all whom it may concern:*

Be it known that I, JOHN A. FERGUSON, of Ferguson, St. Louis county, Missouri, have made a new and useful Improvement in Belts, of which the following is a full, clear, and exact description.

The present improvement relates to that class of belts which are constructed with reference to the liberation of the air which, when a belt is run at great speed, is liable to get between the face of the pulley and the belt whose efficiency is in consequence materially impaired. Attempts have been made to obviate the trouble referred to by perforating the belt, to form air-passages extending through the thickness of the belt, but with partial success only on account of the perforations becoming stopped with the grease and dirt which is apt to collect upon belts. The perforations also tend to weaken the belt. Transversely-extended grooves have also been suggested, but such a method is objectionable, the belt being weakened and the grooves not easily cleaned.

In the improved belt under consideration one or more grooves are formed in that surface of the belt which is applied to the pulley-face, thereby providing air-passages between the belt and the pulley-face, through which the air can escape without having to pass through the belt. The passage or passages in question extend longitudinally in the belt. In depth they may extend more or less into the belt as may be desired: that is, they may extend half way or more through the belt, or only slightly thereinto, and they may have any desirable form in cross-section.

The most desirable mode of carrying out the improvement is exhibited in the annexed drawings, making part of this specification, in which—

Figure 1 is a view looking toward the inner side of the belt, or that side which is toward the pulley-face; Fig. 2, a view of the opposite side of the belt; Fig. 3, a cross-section of the belt on the line 3—3 of Fig. 2; Fig. 4, a view in cross-section of the belt applied to a crowned pulley-face, and Fig. 5, a detail illustrating a modification.

The same letters of reference denote the same parts.

A represents a piece of belting-material— leather, for instance—of suitable width and length for the intended belt.

B B represent narrower pieces of belting-material applied to the inner side, a, of the piece A. The pieces B, B, can be secured in any suitable manner, consistent with the uses of a belt, to the piece A. I preferably cement them thereto. The pieces, B, B, are spaced apart from each other to form the air-passages C, C, substantially as described. The passages are of any desired width, and the width shown in the drawings I consider a desirable one. The described passages may be formed in the belt in any other equivalent manner. The pieces A, and, B B, might be integral as shown in Fig. 5 and the passages be channeled therein. The outer edges of the outermost pieces, B B, are preferably made to coincide with the outer edges respectively of the piece A, substantially as shown, although this is not essential. The belt thus made is used in the customary manner. In addition to the advantage suggested, namely, that the air-passages are less likely to be stopped than are perforations extending through the thickness of the belt, there are others which may be named: the belt easily bends along the lines of the air-passages, and conforms readily to the crowned surface d of the pulley D: the air is so effectively excluded that the top side of the belt sags more upon the pulley and hence the belt has more driving-power; and there is less strain upon the belt-pulley-bearings: the belt runs straighter than does a belt composed of two layers or plies of leather of equal width, the narrower pieces, B, B, each as compared with the wide piece A, being of a more homogeneous nature, and hence, when attached as described to the piece A, serving to correct any unevenness existing therein; the several pieces, B, B, also resist more advantageously a longitudinal strain and are a more durable construction than a single piece whose width equals that of the pieces B B; and the belt can be more readily and economically repaired, as any of the pieces B B—the outside ones, for instance, which are apt to wear the most—can be renewed without having to replace all of them. The pieces B, B, also materially strengthen the belt in the direction of its length. The noise occasioned by air getting between the belt and pulley-face is largely if not entirely obviated. In practice, the grooves, C C, are about one and a half inches apart. Any dirt collecting in them can be easily removed therefrom by holding a suitably-pointed tool in the grooves as the belt is in motion.

The described air-passages are useful not only in a belt which is closed at its outer surface, but also in one which also has perforations extending entirely through the thickness of the belt.

The piece, A, may be a single ply, as shown, or be composed of more than one ply.

The grooving herein described, within certain limits, is an absolute advantage. It enables a belt to be more efficient than either an ordinary smooth belt, or a link belt, of the same width. It is however essential, first, that the proportion of the grooving to the total width of the belt shall not exceed, say one fourth or less than, say one twentieth, and I have, in practice, ascertained that the best results are obtained when the total width of grooving is about one eighth of the belt-width, and, second, that it is essential that the remaining portion of the belt-face be flat to provide sufficient binding-surface for the belt.

The width of any groove, to obtain the best results should not exceed the total thickness (the thickness of an ungrooved portion) of the belt, and it is better for the grooving to be distributed in the form of several grooves equally spaced apart from each other and the sides of the belt, and if otherwise arranged the grooves, to obtain the best results, should be spaced apart a distance equal say to the total thickness of the belt.

I claim—

1. The herein described belting having its inner surface grooved longitudinally to provide an air-passage or passages, and the remaining portion of said surface flat, the grooved portion of said surface within the limits named.

2. The herein described belting having its inner surface grooved longitudinally to provide an air-passage or passages, and the remaining portion of said surface flat, the grooved portion of said surface being within the limits named, and the grooves being formed by means of strips attached to the main portion of the belt in the manner set forth.

3. The herein described belting having its inner surface grooved longitudinally to provide an air-passage or passages and the remaining portion of said surface flat, the grooved portion of said surface being within the limits named, and the grooves being square in cross-section, and formed by means of strips attached to the main portion of the belt in the manner set forth.

Witness my hand this 26th day of May, 1892.

JNO A. FERGUSON.

Witnesses:
C. D. MOODY,
A. BONVILLE.